ns patent [19]

Brueggemann et al.

[11] 3,873,328
[45] Mar. 25, 1975

[54] CATALYTIC CRYSTALLINE GLASS FIBERS
[75] Inventors: Walter H. Brueggemann, Chagrin Falls; Jack S. Gilhart, Salem, both of Ohio
[73] Assignee: Ferro Corporation, Cleveland, Ohio
[22] Filed: Aug. 9, 1972
[21] Appl. No.: 279,210

[52] U.S. Cl. ............... 106/39.6, 106/50, 252/467, 252/470, 252/471, 252/472, 252/474, 252/476
[51] Int. Cl. ...... C03c 13/00, B01j 11/32, C03c 3/30
[58] Field of Search ............ 106/48, 48 C, 50, 39.6; 252/467, 470, 471, 472, 474, 476

[56] References Cited
UNITED STATES PATENTS

| | | | |
|---|---|---|---|
| 3,109,511 | 11/1963 | Slayter et al. | 106/48 C |
| 3,266,477 | 8/1966 | Stiles | 106/48 C |
| 3,460,523 | 8/1969 | Stiles et al. | 106/48 C |
| 3,468,646 | 9/1969 | Finn et al. | 106/48 C |
| 3,484,259 | 12/1969 | Lewis et al. | 106/48 C |
| 3,547,098 | 12/1970 | Lee | 106/48 C |
| 3,562,184 | 2/1971 | Dodd et al. | 106/48 C |
| 3,639,113 | 2/1972 | Aslanova et al. | 106/50 |
| 3,718,498 | 2/1973 | Denny et al. | 106/48 C |

*Primary Examiner*—Winston A. Douglas
*Assistant Examiner*—Mark Bell
*Attorney, Agent, or Firm*—Milton L. Simmons; Wesley B. Taylor

[57] ABSTRACT

Catalytic, oxidation-inducing glass fibers and a process for forming them are disclosed in which the glass of the fibers is substantially crystalline and contains from about 10 percent to about 70 percent by weight of an oxide selected from the group consisting of an oxidation-inducing oxide of cobalt, manganese, copper, chromium, and mixtures thereof. The crystalline glass fibers are prepared by fiberizing a glass composition containing at least one of the metal oxides to form amorphous glass fibers; and then heat-treating the resulting glass fibers at an elevated oxidation temperature but below the liquidus temperature of the glass of the fibers to crystallize at least part of the amorphous glass.

8 Claims, No Drawings

CATALYTIC CRYSTALLINE GLASS FIBERS

BACKGROUND OF THE INVENTION

A porcelain enamel frit containing an oxidation-inducing metal oxide, such as cobalt oxide, has been suggested, for example, in U.S. Pat. 3,547,098 to Lee. Such frit may be used as a porcelain enamel coating for oven liners, or the like, where its ability when heated to oxidize foreign matter such as oven soils converts the oven to a desired self-cleaning type. Still other applications for the frit are possible, such as in forming vitreous coatings for exhaust systems of paint-baking ovens or automotive exhaust systems, the interiors of which can be coated with enamel from the frit to render passing gases less noxious and objectionable prior to their discharge from the systems by oxidizing the gases. Although the present invention is not to be bound by theory, it is generally accepted that for a certain material to have a catalytic effect, such as in oxidation-inducing, the material must have active sites of potentially high chemical activity. To one skilled in the art, this means a crystalline structure in which atoms of materials are arranged in preordained fashion. According to one view, catalysts operate effectively because certain ions in the crystal lattice are not completely coordinated within the nucleus of the crystal, that is, such ions lie on a "corner" or "edge" of a crystal. Therefore, the use of glass fibers which are well-known to be amorphous and non-crystalline, would not at all be expected to be useful for catalytic oxidation-inducing activity.

SUMMARY OF THE INVENTION

In accordance with the present invention, catalytic, oxidation-inducing glass fibers are formed by converting amorphous glass fibers, containing an oxidation-inducing metal oxide, into a crystalline form in which the metal oxide is in a suitably higher state of activity that the fibers can effectively serve as a chemical-oxidation promoter. The surface characteristics at least of the fibers are important to their catalytic activity.

More particularly, a glass composition containing from about 10 percent to about 70 percent by weight of an oxide selected from the group consisting of an oxide-inducing oxide of cobalt, manganese, copper, chromium, and mixtures thereof, and preferably from about 15 percent to about 55 percent, is fiberized at an elevated oxidizing temperature but below its liquidus temperature to form amorphous glass fibers containing the oxide distributed substantially throughout the fibers. The resulting glass fibers are then heat treated, for example, from about 1,000°F to about 1,600°F for a sufficient time to crystallize at least some and preferable a substantial portion of the glass of the amorphous glass fibers, for instance, for about 10 minutes to about 60 minutes.

The glass fibers may be used in any convenient manner, such as in batt, mat, or glass wool form, and mounted in a given installation as to be exposed to material which is to be oxidized. The high surface area of the glass fibers considerably improves intimate contact between such material and the catalytic fibers to promote oxidation. The fibers effectively supply oxygen when oxidizable materials contact them, while oxygen from the atmosphere is absorbed by the fibers and, it is theorized, stored or diffused throughout the crystalline body of the glass. In this manner, sufficient excess oxygen is available to promote oxidation as desired when the fibers are subsequently heated to an oxidizing temperature. This oxidation absorption phenomenon seems to occur at about the same temperature as needed for oxidation of combustible material contacting the glass fiber surface. The effect is greatly enhanced by the presence within the fibers of certain oxidation-inducing metal oxides, such as cobalt oxide, which preferably are substantially uniformly distributed throughout the fibers.

DESCRIPTION OF THE PREFERRED EMBODIMENTS

The glass composition used to prepare fibers of the present invention is not critical as long as it contains an oxidation-inducing metal oxide as hereinafter described. The glass, in a sense, is merely a carrier for the oxide, although the amorphous-crystalline character of the glass is significant insofar as the catalytic activity of its fibers is concerned. In general, the glass should have a fusibility and other physical characteristics as to be fiberized by standard known means.

The following Table 1 lists various oxide components in addition to the oxidation-inducing oxides, which can be used to prepare a glass composition useful to the present invention. A general range for each component is given by weight percent, it being understood that, as the weight percentage varies for the components within the indicated range, the total reaches 100 percent. One or more of the following listed components may be completely eliminated in any given glass composition, and still other well-known oxides which are not listed may be added for various purposes to meet diverse requirements.

TABLE I

OXIDES FOR GLASS COMPOSITION

| | Wt./percent |
| --- | --- |
| BaO | 0–20 |
| $B_2O_3$ | 0–30 |
| CaO | 0–30 |
| $K_2O$ | 0–20 |
| $Li_2O$ | 0–15 |
| $Na_2O$ | 0–20 |
| $P_2O_5$ | 0–20 |
| $Sb_2O_5$ | 0–30 |
| $SiO_2$ | 10–60 |
| $TiO_2$ | 0–30 |
| ZnO | 0–20 |
| $F_2$* | 0–10 |
| Oxidation inducing metal oxides | 10–70 |

*$F_2$ computed as replacing $O_2$ in the above composition.

The oxidation-inducing metal oxides may be any one or combination of the oxides of copper, cobalt, manganese, and chromium. The quantity of the oxidation-inducing metal oxides used is dependent upon the elements that make up the glass only to the degree that higher levels of oxidation-inducing metal oxides might vary the fusibility of a given glass or otherwise alter its workability characteristics, thereby requiring appropriate adjustment of the amount of oxidation-inducing metal oxides within their stated ranges.

Of the listed oxidation-inducing metal oxides, cobalt oxide is preferred. Although it is not necessary, for best results, chromium oxide should be used in combination with at least one other of the oxidation-inducing oxides, since chromium oxide alone renders the glass composition more refractory. Preferably, at least 5% of an oxide of cobalt, manganese or copper, based on the weight of the glass, should be used with chromium oxide.

In general, the glass composition may contain from about 10 percent to about 70 percent by weight of the oxidation-inducing metal oxide and preferably from about 15 percent to about 55 percent. There is no readily measurable upper limit of the oxidation-inducing oxide, the only requirement being that there be enough other glass-forming components to provide a glass which is workable and which can be fiberized with standard equipment.

The glass composition may be prepared in any desired manner, as by admixing the components while in a dry state. The particle size of the oxidation-inducing metal oxide is not critical, since the entire mass is eventually melted. Such melting followed by fiberization may be carried out by conventional, known equipment, such as by enveloping a fine molten stream of the glass in a blast of air and attenuating the stream into fine, usually discontinuous fibers which are collected on a screen in interlaced mat or batt form. It is not necessary to use a binder for the fibers, but if one is applied it must be resistant to the temperatures at which the mat or batt will be used in practice. The size of the fibers is dictated more by their particular eventual application, rather than the fiberizing technique employed. Glass fibers of standard dimensions are satisfactory. In general, the fibers can be of any reasonable length and preferable have at least a sufficiently small diameter to render the fibers flexible.

After the glass composition is fiberized and the fibers collected in a desired physical form, the fibers are amorphous and non-crystalline. In accordance with the present invention, the fibers are next heat treated to convert some and preferably a substantial portion of the amorphous glass into a crystalline form in which an oxidation-inducing metal oxide becomes a part of the structure of the crystal. As such, the crystalline glass of the fibers has active sites which are able to catalyze oxidation reactions.

While the optimum heat-treating range may vary for different glass compositions, the maximum temperature permissible must be below the liquidus temperature of the glass and preferably at least about 100°F below it. The minimum temperature of the heat-treating range is that at which crystallization can first occur. As a rule, fibers formed from most glasses can be heat treated in the range of about 1000°F. to about 1600°F. The rate of heating the fibers to a temperature within the heat-treating range is not critical.

Similarly, the time of the heat treatment need only be sufficiently long to induce some crystallization of the glass in order to realize benefits of the present invention. Normally, the glass fibers are heat treated to obtain as much crystallization as is feasible under the circumstances. It may not be practical to obtain 100 percent crystallization. As a rule, glass fibers of the present invention are heat treated within the described temperature range for about 10 minutes to about 60 minutes, although heat treatments for as long as 3 hours have been carried out.

After the fibers have been heat treated, they may be installed as desired in any environment in which oxidation of a combustible material is desired. For example, a body of fibers may be installed along one or more walls of an oven to oxidize oven soils. Or a mat of the present glass fibers may line an automotive muffler or other chamber in an automotive exhaust system to oxidize gases, such as carbon monoxide to carbon dioxide. Generally, little or no effective oxidation can be achieved below a temperature of about 350°F, while the upper temperature limit of oxidation utilizing the present glass fibers is in the vicinity of about 600°F.

The following examples are intended to illustrate the invention and should not be construed as imposing limitations on the claims.

EXAMPLE 1

A relatively simple glass composition that may be used in practicing the invention is:

| | Parts by Weight |
|---|---|
| Barium Carbonate | 520 |
| Cobalt Oxide | 1,328 |
| Boric Acid | 730 |

The glass was melted at 2,500°F and maintained in a molten state for about 50 minutes to insure homogeneity. When the resulting glass composition was fiberized, the fibers had this composition.

| | Weight Percent |
|---|---|
| $BaO$ | 18 |
| $B_2O_3$ | 19 |
| $CoO$ | 63 |

Examples 2 through 4

Table II lists three different glass compositions in weight percent that may be used in glass fibers of the present invention. $R_2O_3$ refers to oxides of metals having a valance of three other than those listed.

Each glass composition was melted at about 2,350°F. and the melt fiberized in the following manner. A molten glass stream of the melt at about 2,300°F. was directed axially through a metal venturi supplied with compressed air through an annular slit in the throat section of the venturi. The air was exhausted into a wooden box collector having screens of one-sixteenth inch mesh on which to collect the fibers. The air pressure used was in the range of about 100 to 150 psi.

The resulting glass fibers were heat treated at about 1,400°F to 1,500°F for about 20 to 30 minutes, although values outside these ranges could have been used.

TABLE II

| | Glass Fiber Compositions Weight Percent | | |
|---|---|---|---|
| Example | 2 | 3 | 4 |
| $Na_2O$ | 1.81 | 3.86 | 2.14 |
| $B_2O_3$ | 3.13 | 3.21 | 3.57 |
| $SiO_2$ | 35.10 | 29.54 | 40.00 |
| $ZnO$ | 3.91 | 4.10 | — |
| $Li_2O$ | 0.79 | 0.83 | 0.95 |
| $BaO$ | — | 1.33 | 2.29 |
| $K_2O$ | 5.38 | 5.54 | 6.44 |
| $CaO$ | 0.46 | 0.24 | 0.53 |
| $P_2O_5$ | 0.57 | 0.58 | 0.69 |
| $Sb_2O_5$ | 7.55 | 9.65 | 9.00 |
| $MnO_2$ | 32.20 | 33.45 | — |
| $TiO_2$ | 8.30 | 6.90 | 9.90 |
| $R_2O_3$ | 0.82 | 0.86 | — |
| $Co_2O_3$ | — | — | 19.95 |
| Total | 100.02 | 100.00 | 100.18 |

The heat treated fibers were found to have a catalytic, oxidative effect on combustible gases.

While the foregoing describes several preferred embodiments of the present invention, it is understood that the invention may be practiced in still other forms within the scope of the following claims.

What is claimed is:

1. A catalytic oxidation-inducing glass fiber adapted to contact an oxidizable gas to catalyze the oxidation thereof at a temperature within the range of about 350°F to about 600°F, said glass fiber comprising a heat-treated, catalytic-oxidative fiber of normally amorphous glass having substantial crystallinity throughout the fiber by virtue of such heat treatment, and containing as part of the crystal structure from about 10 percent to about 70 percent by weight of an oxidation-inducing oxide defining sites of chemical activity to render the fiber catalytic for oxidation reactions, said oxide being selected from a group consisting of an oxide of cobalt, manganese, copper, chromium, and mixtures thereof.

2. The glass fiber of claim 1 in which said glass fiber is associated with a plurality of other like fibers in mat or batt form, and said mat or batt form is adapted to contact the gas to be oxidized.

3. The glass fiber of claim 1 in which said oxide is chromium oxide in combination with at least 5 percent by weight of the glass of an an oxide of cobalt, manganese, copper, and mixtures thereof.

4. The glass fiber of claim 1 in which said oxide is present in an amount of about 15 percent to about 55 percent by weight.

5. The glass fiber of claim 1 in which said oxide is manganese oxide.

6. The glass fiber of claim 1 in which said oxide is copper oxide.

7. The glass fiber of claim 1 in which said oxide is cobalt oxide.

8. The glass fiber of claim 1 in which said oxide is chromium oxide.

* * * * *